(12) United States Patent
Fagan et al.

(10) Patent No.: US 10,053,386 B2
(45) Date of Patent: Aug. 21, 2018

(54) METHOD FOR FORMING OPTICAL FIBER AND PREFORMS (71) Applicant: CORNING INCORPORATED, Corning, NY (US)

(72) Inventors: James Gerald Fagan, Painted Post, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/261,734

(22) Filed: Apr. 25, 2014

(65) Prior Publication Data
US 2015/0307387 A1 Oct. 29, 2015

(51) Int. Cl.
C03B 37/012 (2006.01)
C03B 37/014 (2006.01)
C03B 37/027 (2006.01)

(52) U.S. Cl.
CPC ...... *C03B 37/01282* (2013.01); *C03B 37/014* (2013.01); *C03B 37/01211* (2013.01); *C03B 37/01231* (2013.01); *C03B 37/01446* (2013.01); *C03B 37/027* (2013.01); *C03B 2203/31* (2013.01); *C03B 2203/34* (2013.01); *C03B 2203/42* (2013.01)

(58) Field of Classification Search
CPC .......... C03B 2203/34; C03B 37/01282; C03B 37/01446
See application file for complete search history.

(56) References Cited

U.S. PATENT DOCUMENTS

| | | | |
|---|---|---|---|
| 463,852 A | 1/1887 | Bradley | |
| 4,501,601 A | 2/1985 | Haupt | |
| 4,648,891 A * | 3/1987 | Abe | C03B 37/01211 65/412 |
| 4,749,396 A * | 6/1988 | Hicks, Jr. | C03B 37/01211 65/412 |
| 4,961,767 A | 10/1990 | Schermerhorn et al. | 56/2 |
| 5,049,175 A | 9/1991 | Röss et al. | |
| 5,063,003 A | 11/1991 | Gonzalez-Oliver | 264/14 |
| 5,244,485 A | 9/1993 | Hihara et al. | |
| 5,352,259 A | 10/1994 | Oku et al. | 65/412 |
| 5,922,099 A * | 7/1999 | Yoon | C03B 19/12 425/468 |

(Continued)

FOREIGN PATENT DOCUMENTS

| | | |
|---|---|---|
| JP | 6191870 A | 7/1994 |
| JP | 9071431 A | 3/1997 |

(Continued)

OTHER PUBLICATIONS

Yoshida, Kazuaki et al., "Studies on the Strength of Optical Fiber Fabricated by a Hybridized Process," Journal of Lightwave Technology; Nov. 1996, pp. 2513-2518, V14, No. 11.

(Continued)

*Primary Examiner* — John M Hoffmann (74) *Attorney, Agent, or Firm* — Svetlana Short (57) ABSTRACT

A method of forming an optical fiber includes the steps of forming a silica-based soot blank with at least one silica-based soot core cane at least partially embedded in the soot blank. The soot blank with the soot core cane positioned therein is consolidated to form a preform. The preform is then drawn to form an optical fiber. The soot core cane preferably has an average bulk density within 10% of the bulk density of the soot blank, and more preferably within 5% of the bulk density of the soot blank.

8 Claims, 6 Drawing Sheets

(56) References Cited

U.S. PATENT DOCUMENTS

| | | | |
|---|---|---|---|
| 5,944,667 A | 8/1999 | Leveque et al. | |
| 6,154,594 A | 11/2000 | Fiacco et al. | 385/126 |
| 6,418,258 B1 | 6/2002 | Wang | |
| 7,069,746 B2 | 7/2006 | Oswald et al. | 65/17.3 |
| 2002/0168139 A1* | 11/2002 | Clarkson | G02B 6/262 |
| | | | 385/27 |
| 2003/0164006 A1 | 9/2003 | Buchanan et al. | |
| 2007/0062337 A1 | 3/2007 | Dai et al. | |
| 2008/0203625 A1 | 8/2008 | Oswald et al. | 264/604 |
| 2009/0324817 A1 | 12/2009 | Sowa | 427/181 |
| 2010/0071421 A1 | 3/2010 | Dawes et al. | 65/427 |
| 2010/0107700 A1 | 5/2010 | Dawes et al. | 65/404 |
| 2011/0132038 A1 | 6/2011 | Dawes et al. | 65/408 |
| 2012/0047959 A1 | 3/2012 | Allen et al. | 65/421 |
| 2012/0114292 A1 | 5/2012 | Hoover et al. | 385/124 |
| 2014/0060118 A1 | 3/2014 | Dawes et al. | |

FOREIGN PATENT DOCUMENTS

| | | | |
|---|---|---|---|
| JP | 04407328 B2 | 2/2010 | |
| WO | WO2012021317 A1 | 2/2012 | C03B 19/14 |
| WO | 2013130141 A1 | 9/2013 | |
| WO | 2015073230 A1 | 5/2015 | |
| WO | 2015157073 A1 | 10/2015 | |

OTHER PUBLICATIONS

Yoshida, Kazuaki et al., "Fabrication of Low-Loss Optical Fibers by Hybridized Process," Electronics and Communications in Japan, Part 2, 1997, pp. 7-15, vol. 80, No. 2, Scripta Technica, Inc.

Yoshida, Kazuaki et al., "Fabrication of Optical Fiber Preform by CIP Forming Technique," Journal of the Ceramic Society of Japan, 1996, pp. 524-528, vol. 104 [6].

Yoshida, Kazuaki et al., "Fabrication of Large Preforms for Low-Loss Single-Mode Optical Fibers by a Hybridized Process," Glass Science and Technologies, Apr. 4, 1996, pp. 412-416, vol. 69, No. 12.

Vladimir V. Velmiskin et al., "Active Material for Fiber Core Made by Powder-in-Tube Method: Subsequent Homogenization by Means of Stack-and-Draw Technique," Microstructured and Specialty Optical Fibres, Proc. of SPIE, 2012, 8 pages, vol. 8426.

Yoshida, Kazuaki and Morikawa, Takayuki, "Optical Fibers with Polygonal Cladding," Optical Fiber Technology, Apr. 3, 1997, pp. 273-277, vol. 3, Academic Press.

European Patent Office, Notification of Transmittal of the International Search Report re: PCT/US2015/027421, dated Jul. 29, 2015, 1 page.

European Patent Office, International Search Report re: PCT/US2015/027421, dated Jul. 29, 2015, 5 pages.

European Patent Office, Written Opinion of the International Searching Authority re: PCT/US2015/027421, dated Jul. 29, 2015, 6 pages.

B. Geittner, "Preparation of Opitcal Fibres by Means of the PCVD Process," Proceedings on the Ninth International Conference on Chemical Vapor Deposition, vol. 84-6, 1984, pp. 479-502, The Electrochemical Society, Inc., USA.

Geittner; "Preparation of Optical Fibers by Means of the PCVD Process"; Proceedings of the Ninth International Conference on Chemical Vapor Deposition; 1984; 33 Pages.

EP15720546.9 Office Action dated Jun. 14, 2018, European Patent Office, 7 pgs.

\* cited by examiner

METHOD FOR FORMING OPTICAL FIBER AND PREFORMS

FIELD OF THE INVENTION

The present invention generally relates to methods for making optical fibers using soot blanks and core canes, and particularly to a method for making optical fiber preforms for drawing into optical fibers.

TECHNICAL BACKGROUND

Data transfer is fast approaching ultimate capacity limits for single mode optical fiber transmission systems. The use of multicore optical fibers has emerged as one solution which enables further growth in the capacity of optical fibers. Multicore optical fibers permit parallel transmission using space-division multiplexing. Multicore optical fibers increase transmission capacity by N-fold, where "N" is the number of cores in the multicore optical fiber. Particularly for short distance networks, space-division multiplexing through multicore optical fibers is a method well-suited for increasing bandwidth density.

One current method for producing multicore optical fibers includes positioning glass core canes in soot blanks, then consolidating the soot blanks and glass core canes to form glass preforms. The preforms are drawn to make optical fibers. However, when preforms are made this way, flaws are frequently present near the glass core cane surface following consolidation of the preform, limiting the quality of multicore fibers produced using such methods.

SUMMARY

According to one embodiment, a method of forming an optical fiber includes the steps of forming a silica-based soot blank with at least one silica-based soot core cane at least partially embedded in the soot blank. The soot blank with the at least one soot core cane positioned therein is consolidated to form a preform. The preform is then drawn to form an optical fiber.

According to another embodiment, a method of forming an optical fiber includes forming a silica-based soot blank with at least one core cane at least partially embedded in the soot blank, wherein the at least one core cane includes an outer portion which is not fully consolidated prior to its positioning in the soot blank. The average bulk density of the at least one core cane is within 10% of the bulk density of the soot blank. The soot blank with the at least one core cane positioned therein is then consolidated to form a preform. The preform is drawn to form an optical fiber.

Yet another embodiment includes a method of forming a preform for an optical fiber. A silica-based soot body is press formed around at least one silica-based soot core cane, wherein the soot core cane is not consolidated to form a sintered glass prior to the press forming. The soot body is consolidated with the soot core cane positioned therein to form a preform.

Additional features and advantages will be set forth in the detailed description which follows, and in part will be readily apparent to those skilled in the art from that description or recognized by practicing the embodiments as described herein, including the detailed description which follows, the claims, as well as the appended drawings.

The method disclosed herein reduces the occurrence of flaws in the multicore optical fiber resulting from stresses encountered during consolidation, and is an economic and scalable method for production.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

Figure 1A:
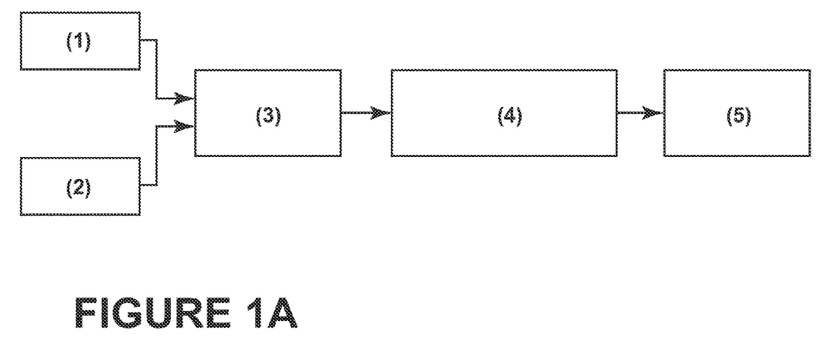
FIG. 1A is a process flow chart depicting one embodiment of a method for forming an optical fiber, according to the present disclosure.

FIG. 1A depicts a first embodiment of a method for forming optical fibers 16. In the embodiment depicted in FIG. 1A, the method includes the steps of (1) forming a silica-based soot blank 10 and (2) forming a soot core cane 12. (3) The soot core cane 12 is positioned in the soot blank 10, and (4) the soot blank 10 and soot core cane 12 are consolidated to form a preform 14. (5) The preform 14 is then drawn to form an optical fiber 16.

Figure 1B:
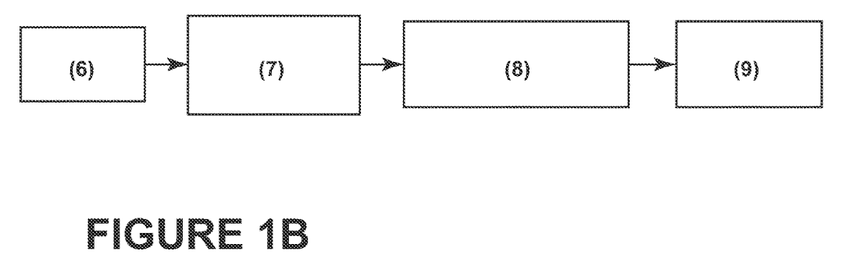
FIG. 1B is a process flow chart depicting another embodiment of a method for forming an optical fiber, according to the present disclosure.

FIG. 1B depicts another embodiment of a method for forming optical fibers 16. In the embodiment depicted in FIG. 1B, the method includes the steps of (6) forming a soot core cane 12, and then (7) press forming soot around the soot core cane 12 to form a soot blank 10. (8) The soot blank 10 and soot core cane 12 are then consolidated to form a preform 14. (9) The preform 14 is then drawn to form an optical fiber 16.

In the methods depicted in both FIGS. 1A and 1B, the silica-based soot blank 10 is formed with at least one silica-based soot core cane 12 at least partially embedded in the soot blank 10. The soot blank 10 is then consolidated with the soot core cane 12 positioned therein to form a preform 14. The preform 14 is then drawn to form an optical fiber 16. The method described herein can be used with one core cane 12 to make a single core fiber 16 according to one embodiment or with a plurality of core canes 12 to make a multicore optical fiber 16 according to another embodiment.

Figure 2:
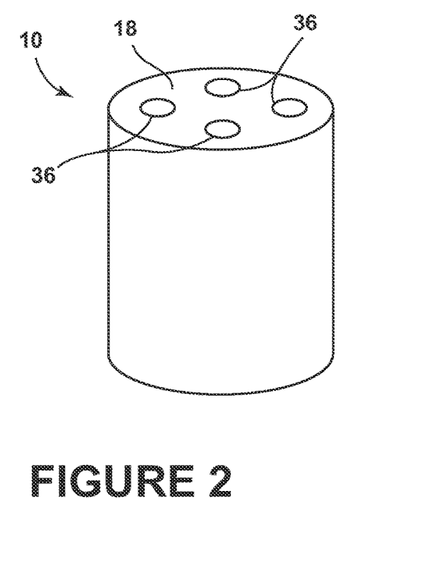
FIG. 2 is a top perspective view of a soot blank for use in one embodiment of the method of forming an optical fiber according to the present disclosure.
Figure 2A:
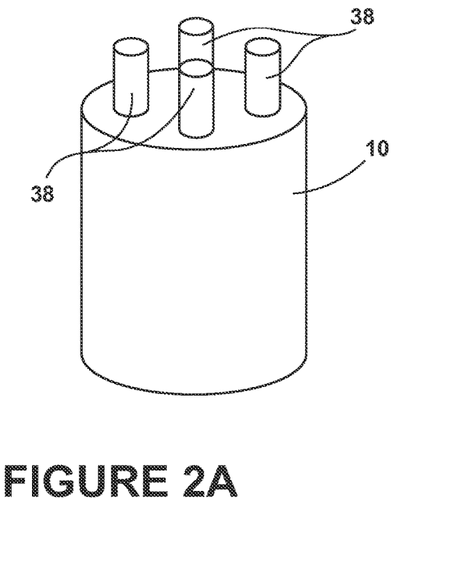
FIG. 2A illustrates an embodiment in which a soot blanks 10 is formed by pressing soot material around mold rods 38, and then removing mold rods 38 to form the blank 10 with a plurality of holes 36.

The soot blank 10, embodiments of which are depicted in FIGS. 2 and 2A, is formed from an unconsolidated or a partially consolidated silica-based material which is appropriate for cladding of optical fibers 16. In one embodiment the soot blank 10 is a $SiO_2$ material. In alternate embodiments, the $SiO_2$ material may be doped with elements such as F, B, Ge, Er, Ti, Al, Li, K, Rb, Cs, Cl, Br, Na, Nd, Bi, Sb, Yb, or combinations thereof, or other elements known for use in cladding of optical fibers 16. The soot blank 10 as described herein can be formed via a soot pressing process, an outside vapor deposition ("OVD") process, or any other known method for preparing a soot blank 10. The soot blank 10 for use herein preferably has a top surface 18 with a diameter of from 150 mm to 300 mm, and preferably has a length of greater than 1 m, and more preferably has a length between 1 m and to 2 m. In alternate embodiments, the soot blank 10 may have a generally rectangular or other polygonal-shaped top surface 18.

Generally, in the soot pressing process, particulate soot material is deposited into a mold cavity, and pressure is applied against the particulate soot material in the mold to form the soot blank 10. The soot pressing process may include forming a solid soot blank 10, or forming a soot blank 10 with holes in predetermined locations by pressing the soot material around the core canes 12 or around removable mold rods 38. The soot pressing process is usually carried out at pressures of from 25 psig to 250 psig, and the particulate soot material can be radially compressed, axially compressed, laterally compressed, or compressed in any other method to form the soot blank 10. Preferably, radial pressure is applied with a maximum pressure of 150 psig, using a pressurization rate of from 1 psig/minute to 10 psig/minute, and holding the soot material at the maximum pressure for a time of 30 minutes to a time of 2 hours. In this preferred method, the soot blank 10 is then depressurized at a depressurization rate of 1 psig/minute to 10 psig/minute until ambient room pressure is reached. The compacted soot material formed via press forming is optionally partially consolidated to form soot blanks 10 which have a desired density for further processing. Alternatively, depending on the formation, the soot blank 10 may have a sufficient density for further processing without partial consolidation.

Generally, in the OVD process, an inert rod is layered with silica-based soot particles applied around the perimeter of the inert rod. The soot particles are formed by passing ultrapure vapors, such as silicon chloride through a burner, where the vapors react in the flame to form fine silica-based soot particles that are then deposited on the inert rod. The inert rod is rotated during deposition, to form a uniform soot blank 10 around the inert rod. After deposition is complete, the inert rod is preferably removed from the soot blank 10, leaving a central hole 20 through a center axis of the soot blank 10. The soot density after the OVD process is typically around 0.5 g/cm$^3$. The soot blanks 10 formed via OVD processing are optionally partially consolidated to form soot blanks which have a desired density for further processing. Alternatively, depending on the formation, the soot blank 10 may have a sufficient density for further processing without partial consolidation.

Figure 3:
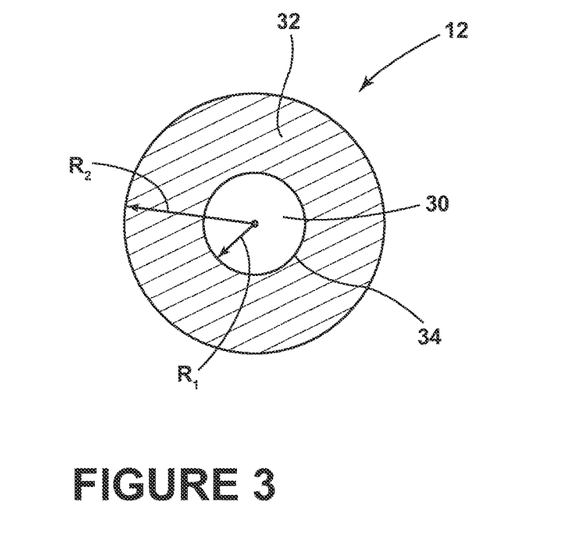
FIG. 3 is a top plan view of one embodiment of a core cane according to the present disclosure.

The core cane 12, one embodiment of which is depicted in FIG. 3, is also formed from a silica-based material. The core cane 12, like the soot blank 10, can be formed via press forming methods, OVD processing methods, a combination of press forming and OVD processing methods, or other production processes for soot material. The core canes 12 for use in the present disclosure can be designed for multimode fiber applications, polarization maintaining fiber applications, photonic crystal fiber applications, as well as single mode multicore fiber applications and single-core fiber applications.

The embodiment of the core cane 12 depicted in FIG. 3 includes an inner portion 30 and an outer portion 32, with the inner portion 30 formed of a first soot material, and the outer portion 32 formed of a second soot material. At least the inner portion 30 ultimately becomes the transmissive portion of the optical fiber 16, and is therefore preferably formed with a doped silica-based material. Any known dopants for increasing transmission can be used in the inner portion 30, including germanium and other known dopants. In one embodiment, the inner portion 30 of the core cane 12 is a glass material which has been fully consolidated. In another embodiment, the inner portion 30 of the core cane 12 is a soot material which has not been consolidated or which has been only partially consolidated.

The outer portion 32 of the core cane 12 as shown in the embodiment depicted in FIG. 3 is a silica-based soot material, and has a different composition than the inner portion 30 of the core cane 12, including a different dopant or no dopant. In certain embodiments, the outer portion 32 has a different density than the inner portion 30. The inner portion 30 is also optionally consolidated to a different degree than the outer portion 32. In certain embodiments, the compositions of the inner portion 30 and the outer portion 32 are the same. When the material of the outer portion 32 of the core cane 12 is the same as the inner portion 30, both portions are used to transmit signals through the core cane 12.

In an alternate embodiment, the core cane 12 that is embedded in the soot blank 10 has at least a portion which is substantially consolidated, preferably the inner portion 30. Such a core cane 12 could be used in either the method disclosed in FIG. 1A or the method disclosed in FIG. 1B.

To form the core cane 12 as depicted in FIG. 3, the inner portion 30 is press formed or formed via the OVD processing method. The inner portion 30 is then optionally partially or fully consolidated. The outer portion 32 is then applied around a circumferential edge 34 of the inner portion 30 by pressing a second soot material around the inner portion 30 or by using the inner portion 30 as the inert rod during the OVD processing method and applying a second soot material around the inner portion 30. Soot pressing conditions for the core canes 12 are generally similar to the soot pressing conditions for soot blanks 10 described herein.

Where "core cane" is used herein, it encompasses both soot core canes 12 and core canes 12 that have fully consolidated inner portions 30. Where the core cane 12 has an unconsolidated or partially consolidated inner portion 30 and unconsolidated or partially consolidated outer portion 32, the core cane 12 is also referred to herein as a "soot core cane."

As used herein, fully consolidated means that the soot material has been substantially fully sintered to form a glass material, by holding the material at its sintering temperature for a time sufficient for the soot material to be converted to a glass material. Partial consolidation means that the sintering process is incomplete, and although the density of the soot material has been increased, the soot material has not been fully converted into a glass material. Partial consolidation can be used for all or part of the core cane 12 or the soot blank 10, separately, or after the core cane 12 is embedded in the soot blank 10. Generally, to partially consolidate a core cane 12 or soot blank 10, the core cane 12 or soot blank 10 is heated to a temperature below the normal sintering peak temperature for the material and is held at that temperature for a predetermined time, optionally under a helium atmosphere. The exposure time and temperature will change depending on the size of the soot blank 10 or core cane 12 and on the composition or presence of any dopants in the silica-based soot material of the soot blank 10 or the core cane 12. Partially consolidating the soot material results in a porous soot material which is strengthened by the formation of glass necks between individual particles of the soot material. In some embodiments, after holding the soot blank 10 or core cane 12 at the partial consolidation temperature for the predetermined time, the soot blank 10 or core cane 12 can be held at a temperature that is elevated with respect to room temperature but which is less than the partial consolidation temperature for an additional period of time to allow the soot blank 10 or core cane 12 to further consolidate and to cool more slowly than if the soot blank 10 or core cane 12 was returned immediately to room temperature.

In the embodiment of the method for forming optical fibers as shown in FIG. 1A, the soot blank 10 is formed prior to inserting the soot core canes 12. The soot blank 10 as used in the process illustrated in FIG. 1A could be manufactured via soot pressing methods, OVD processing methods, or other known soot blank forming methods. In one soot pressing method, the soot material is pressed to form the soot blank 10 with a top surface 18. The soot blank 10 is optionally partially consolidated to reach the desired density. Then, as shown in the embodiment depicted in FIG. 2, a plurality of holes 36 are drilled into the top surface 18 of the soot blank 10 to accommodate positioning of soot core canes 12 in the soot blank 10. In another soot pressing method, as shown in the embodiment depicted in FIG. 2A, the plurality of holes 36 are formed by pressing the soot material around mold rods 38, and then removing the mold rods 38 to form a soot blank 10 with a plurality of holes 36 therethrough in predetermined positions for locating the soot core canes 12.

Figure 4:
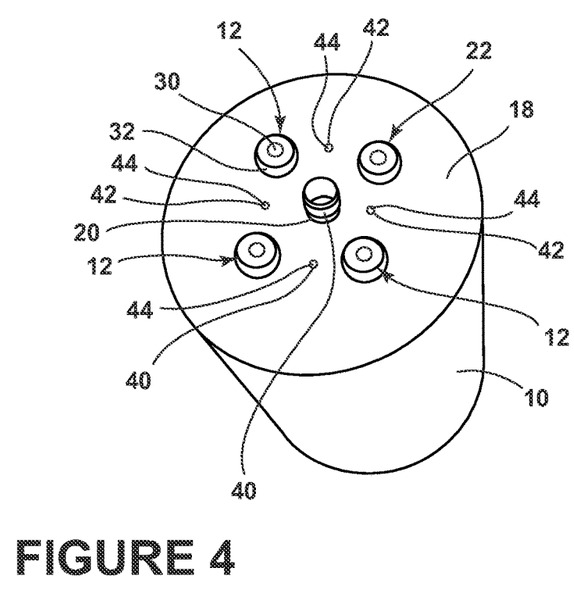
FIG. 4 is a top perspective view of a soot blank with soot core canes positioned therein according to the present disclosure.

The OVD process could also be used to form the soot blank 10, which is optionally partially consolidated to the desired density. As described above, a plurality of holes 36 are drilled into the top surface 18 of the OVD-formed soot blank 10 after it is formed. When formed via OVD processing methods, the soot blank 10 will also have a central hole 20, as shown in FIG. 4, after removal of the inert rod. When the soot blank 10 is formed via an OVD process, an additional glass rod 40 is optionally inserted into the central hole 20 left after removing the inert rod around which the soot blank 10 is formed. The glass rod 40 is preferably formed from the same material as the soot material used to form the soot blank 10. The glass rod 40 operates as a filler of the cladding material that makes up the soot blank 10, and is generally not the same material or construction as a the core canes 12, though the central hole 20 could be used for insertion of an additional core cane 12 if desired.

In the embodiment of the method of forming optical fibers as shown in the process illustrated in FIG. 1B, the soot blank 10 is formed around soot core canes 12. The soot blank 10 as disclosed in FIG. 1B is preferably manufactured via the soot pressing method. The soot core canes 12, which are optionally partially consolidated, are positioned in a predetermined arrangement and the soot material is pressed around the soot core canes 12 to embed them within the compacted soot blank 12. The soot blank 10 and soot core canes 12 are optionally partially consolidated to increase their density.

Figure 7:
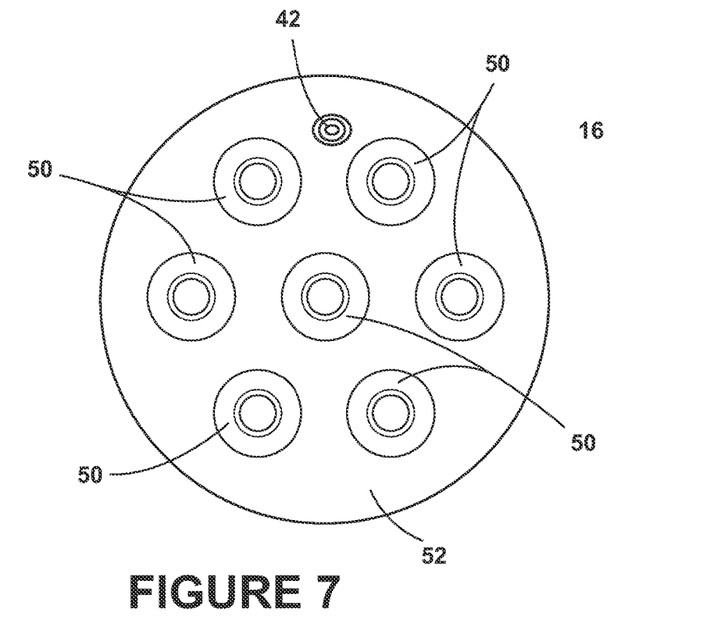
FIG. 7 is a top plan view of another embodiment of a soot blank with core canes and a marker positioned therein, according to the present disclosure.

In addition to core canes 12, alternate embodiments of the soot blank 10 as shown in the embodiments depicted in FIGS. 4 and 7, can accommodate additional elements 42 such as stress rods, metallic rods, markers, conductive or shielding wires or powders, semiconducting rods or powders, or index moots. The additional elements 42 generally have an elongated shape and are also located in at least one hole 44 in the soot blank 10. The soot drilling methods as described herein can be used to drill additional holes 44 in the soot blank 10 for the additional elements 42, mold rods can be used to form the holes 44 for the additional elements 42, or the soot blank 10 can be press formed around the additional elements 42.

A preferred bulk density for the soot blank 10 described herein is between 0.5 g/cm$^3$ and 1.6 g/cm$^3$. If holes 36, 44 will be drilled into the soot blank 10, a preferred bulk density range is from 0.5 g/cm$^3$ to 1.6 g/cm$^3$, or more preferably from 1.0 g/cm$^3$ to 1.6 g/cm$^3$, and more preferred is a bulk density of between 1.2 g/cm$^3$ and 1.5 g/cm$^3$. If the soot blank 10 is press formed around mold rods or around the core canes 12, a preferred bulk density for the soot blank 10 is between 0.7 g/cm$^3$ and 1.0 g/cm$^3$. These preferred densities may be reached through the formation process or through partial consolidation of the soot blank 10.

The core canes 12 used for making preforms 14 and optical fibers 16 in the methods described herein preferably have an average bulk density which is within 10% of the bulk density of the soot blank 10, and more preferably, have an average bulk density which is within 5% of the bulk density of the soot blank 10. To calculate the average bulk density of the core cane 12, the following formula is used:

$$D_c = (A \times D_{op}) + (B \times D_{ip}),$$

Where $D_c$ is the average bulk density of the core cane 12, $D_{op}$ is the bulk density of the outer portion 32 of the core cane 12, and $D_{ip}$ is the bulk density of the inner portion 30 of the core cane 12. The value A is calculated by the equation: $A = R_2/(R_1+R_2)^2$ and the value B is calculated by the equation: $B = R_1/(R_1+R_2)^2$. $R_1$ is the radius of the inner portion 30, and $R_2$ is the radius of the outer portion 32, as shown in the embodiment depicted in FIG. 3. The core canes 12, or any part thereof (e.g., the inner portion 30) can be partially consolidated or fully consolidated to reach the desired density for the core cane 12.

One embodiment of the soot blank 10 with core canes 12 embedded therein is shown in FIG. 4. The soot blank 10 with core canes 12 embedded therein is optionally partially consolidated prior to final consolidation, as described above with respect to either the soot blank 10 or the core canes 12 individually. The embodiment of the soot blank 10 shown in FIG. 4 has a square 4-core configuration, with 4 core canes 12 embedded in the soot blank 10.

Figure 5:
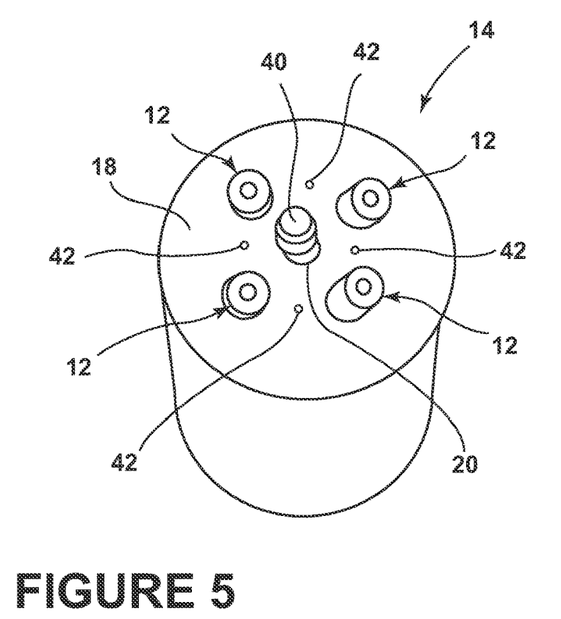
FIG. 5 is a top perspective view of a preform formed by consolidating the soot blank and soot core canes shown in FIG. 4.

The embodiment of a preform 14 depicted in FIG. 5 is a consolidated glass preform 14 formed from the soot blank 10 shown in FIG. 4. To consolidate the soot blank 10 and the core canes 12, the soot blank 10 and the core canes 12 are heated to a final sintering temperature and held at the temperature for a time sufficient to allow glass sintering of the soot blank 10 and the core canes 12. Sintering temperatures preferably range from 1400° C. to 1600° C., and the soot blank 10 and core cane 12 are preferably held at these temperatures for a time of 10 minutes to 120 minutes. Consolidation is optionally carried out under a helium gas flow, which is preferably from 10 standard cubic liters per minute ("sclm") to 50 sclm. In certain embodiments, preparatory steps such as helium purging and/or chlorine drying of the soot blank 10 are carried out prior to heating the soot blank 10 to the sintering temperature. For example, the chlorine drying may be carried out at a temperature of between 1100° C. and 1200° C. for a period of from 60 minutes to 240 minutes, with a chlorine gas flow of 2 sclm. Helium gas flow may be concurrent with the chlorine gas flow, preferably at a rate of 10 standard cubic feet per minute ("scfm") to 50 scfm. Additionally, in certain embodiments the consolidated preform 14 is held at an elevated temperature (higher than room temperature, lower than the sintering temperature) after sintering, which slows the cooling of the consolidated preform 14.

Figure 6:
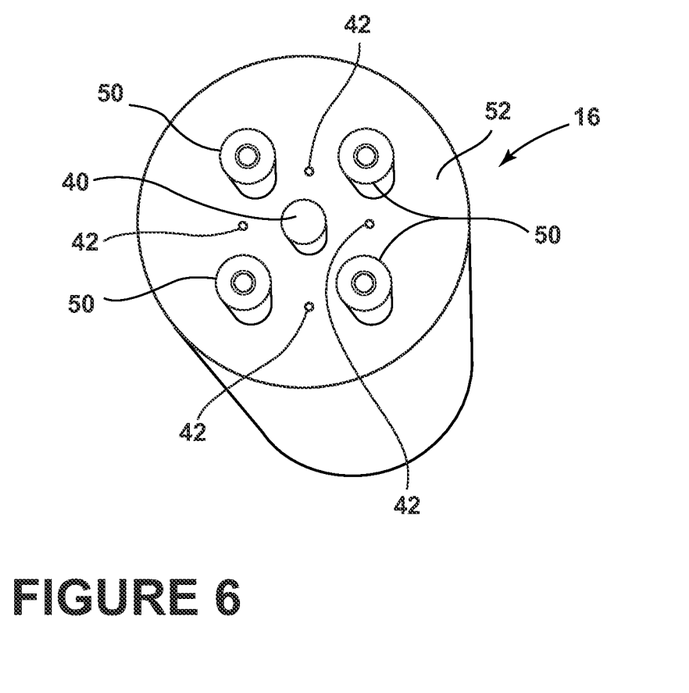
FIG. 6 is a top perspective view of an optical fiber drawn from the preform shown in FIG. 5.

The embodiment depicted in FIG. 6 is the optical fiber 16 drawn from the preform 14 depicted in FIG. 5 using known fiber-drawing methods, such as stretching the preform 14 in a redraw furnace. The resulting optical fiber 16 is a multicore optical fiber 16 with four transmissive cores 50 embedded within an overcladding 52. The diameter of the preform 14 is reduced in the drawing process to lengthen the fiber and the diameter of the core canes 12 within the preform 14 are reduced through the drawing process to form the transmissive cores 50. Where the core canes 12 are formed via an OVD process, a hole sometimes remains following removal of the inert rod, even after fiber draw. In other embodiments, the centerline hole in the core canes 12 may be closed during the consolidation and subsequent fiber draw. Centerline hole closure during the draw has some advantages over centerline closure during redraw with vacuum, because centerline hole closure without vacuum have less non-axisymmetric features near the center of the core cane 12 and have less polarization mode dispersion.

FIG. 7 depicts the cross-section of an alternate embodiment of an optical fiber 16 drawn from a preform 14 according to the present disclosure. The embodiment depicted in FIG. 7 includes an additional element 42, which is a marker that can be used to align multiple optical fibers 16 end-to-end.

Figure 8A:
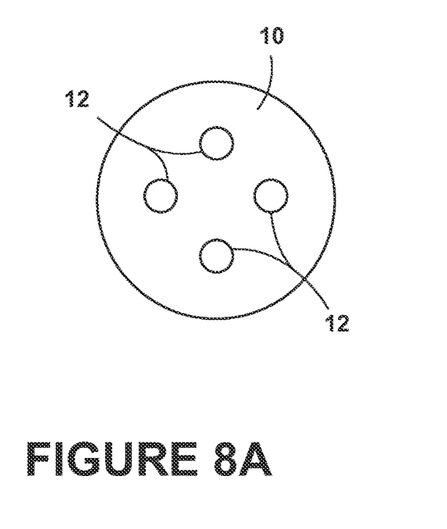
FIG. 8A is a top plan view of a soot blank with 4 holes positioned in a square configuration according to the present disclosure.
Figure 8B:
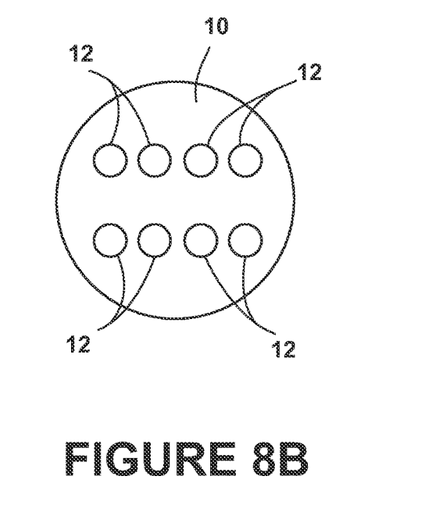
FIG. 8B is a top plan view of a soot blank with 8 holes positioned in a 2×4 configuration according to the present disclosure.
Figure 8C:
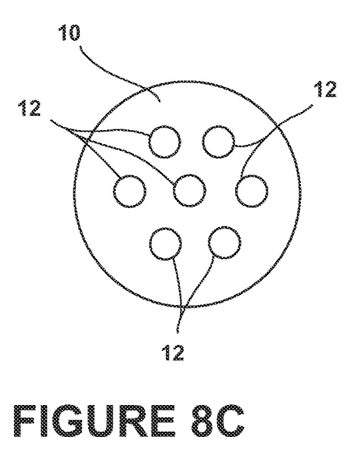
FIG. 8C is a top plan view of a soot blank with 7 holes positioned in a hexagonal lattice configuration according to the present disclosure.
Figure 8D:
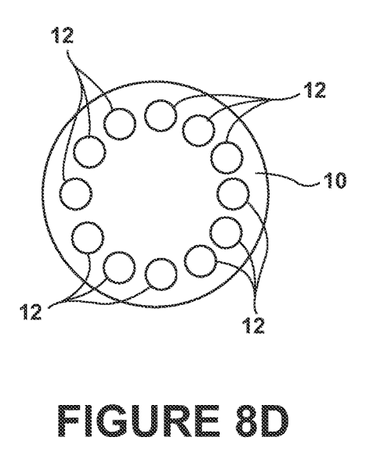
FIG. 8D is a top plan view of a soot blank with 12 holes positioned in a ring configuration according to the present disclosure.
Figure 8E:
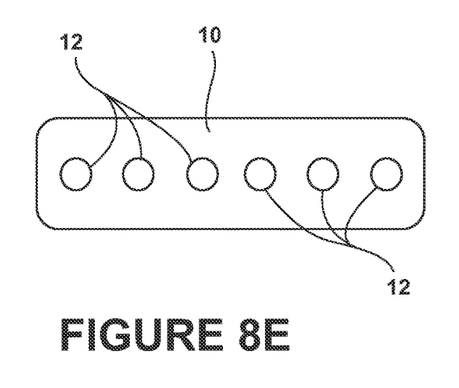
FIG. 8E is a top plan view of a ribbon soot blank with 6 holes positioned in a line configuration according to the present disclosure.

Many configurations for the placement of core canes 12 within the soot blank 10 are possible, and various configurations are illustrated in FIGS. 8A-8E. FIG. 8A depicts a square configuration with four core canes 12. FIG. 8B depicts a 2×4 configuration with eight core canes 12. FIG. 8C depicts a hexagonal lattice configuration with seven core canes 12. FIG. 8D depicts a ring configuration with twelve core canes 12. FIG. 8E depicts a ribbon fiber configuration with six core canes 12. Alternate configurations are also possible, as determined for the operation of the desired optical fiber 16.

The similar density of the core cane 12 and the soot blank 10 described herein reduces distortion due to shrinkage differences between the soot blank 10 and the core canes 12 during consolidation. By reducing the shrinkage differences, flaws in the glass preform 14 are reduced. Use of the soot blanks 10 and core canes 12 as described herein provide flexibility in core cane 12 placement and scalability which allow precision manufacturing of the multicore optical fibers 16. Additionally, increased precision in the production of the preform 14 can be leveraged in the reduction ratio to final multicore geometry for the multicore optical fiber 16 and precision of transmissive core 50 alignment in the multicore optical fiber 16.

The exemplary methods for making optical fibers 16 and optical fiber preforms 14 described herein can be used for making optical fibers 16 with one core 50, with multiple cores 50, with additional elements 62, such as markers, index moots, stress rods, or other features as further described herein or as known in the art. Optical fibers 16 that can be made using these methods include single polarization fibers, polarization maintaining fibers, bend insensitive fibers, multicore fibers, multicore fiber ribbons and photonic crystal fibers.

It will be apparent to those skilled in the art that various modifications and variations can be made without departing from the spirit or scope of the claims.

What is claimed is:

1. A method of forming an optical fiber, comprising the following steps:
   positioning at least one soot core cane in a mold cavity;
   press forming a soot material comprising silica around the at least one soot core cane in the cavity to form a soot blank, the at least one soot core cane embedded in the soot blank;
   consolidating the soot blank with the at least one soot core cane embedded in the soot blank to form a preform having at least one core cane; and
   drawing the preform and the at least one core cane to form an optical fiber having at least one transmissive core,
   wherein an average bulk density of the at least one soot core cane is within 10% of a bulk density of the soot blank prior to the consolidating step, and
   further wherein the at least one soot core cane comprises unconsolidated or partially consolidated silica soot.

2. The method of claim 1, wherein the at least one soot core cane is a plurality of soot core canes, and the optical fiber is a multicore optical fiber.

3. The method of claim 1, wherein the average bulk density of the at least one soot core cane is within 5% of the bulk density of the soot blank prior to consolidating the soot blank and the at least one soot core cane to form the preform.

4. The method of claim 3, further comprising the step:
   partially consolidating at least one of the group consisting of the soot blank and the at least one soot core cane, wherein the step of partially consolidating is conducted prior to the consolidating step.

5. The method of claim 1, wherein the at least one soot core cane is formed via a press forming process.

6. The method of claim 1, wherein the at least one soot core cane is formed via an outside vapor deposition process.

7. The method of claim 1, wherein an inner portion of the at least one soot core cane has a different chemical composition than an outer portion of the at least one soot core cane.

8. A method of forming a preform for an optical fiber, comprising the following steps:
   press forming a soot body comprising silica soot around at least one soot core cane; and consolidating the soot body around the at least one soot core cane to form a preform having at least one core cane, wherein an average bulk density of each soot core cane is within 10% of a bulk density of the soot body prior to the consolidating step, further wherein the at least one soot core cane comprises unconsolidated or partially consolidated.

\* \* \* \* \*

UNITED STATES PATENT AND TRADEMARK OFFICE
CERTIFICATE OF CORRECTION

PATENT NO. : 10,053,386 B2
APPLICATION NO. : 14/261734
DATED : August 21, 2018
INVENTOR(S) : James Gerald Fagan et al.

It is certified that error appears in the above-identified patent and that said Letters Patent is hereby corrected as shown below:

On the Title Page

On page 2, Column 2, item [56], other publications, Line 23, delete "B. Geittner," and insert -- P. Geittner, --, therefor.

On page 2, Column 2, item [56], other publications, Line 23, delete "Opitcal" and insert -- Optical --, therefor.

In the Claims

In Column 9, Line 8, Claim 8, delete "consolidated." and insert -- consolidated silica soot. --, therefor.

Signed and Sealed this
Twenty-seventh Day of December, 2022

Katherine Kelly Vidal
*Director of the United States Patent and Trademark Office*